No. 667,507. Patented Feb. 5, 1901.
J. H. DIERCKS.
CAR BRAKE.
(Application filed Oct. 15, 1900.)
(No Model.)
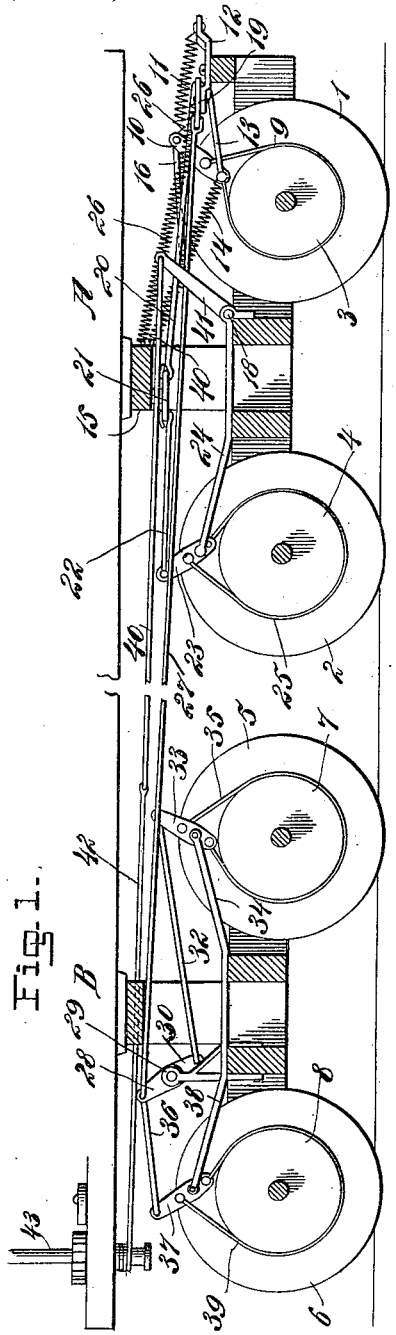
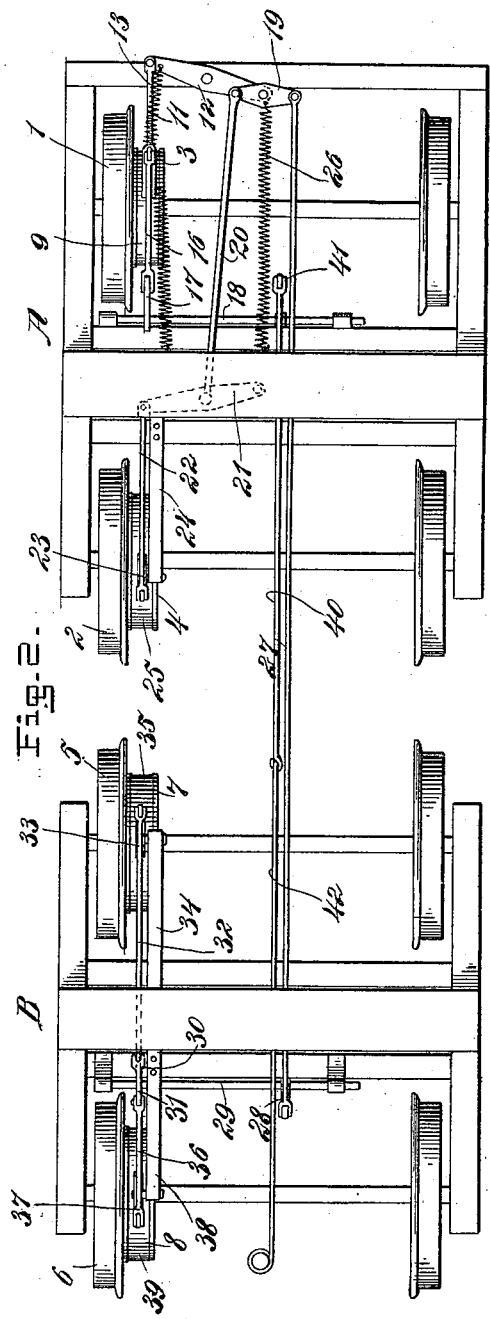
WITNESSES:
James P. Duhamel
C. R. Ferguson
INVENTOR
John H. Diercks.
BY Munn & Co
ATTORNEYS

UNITED STATES PATENT OFFICE.

JOHN H. DIERCKS, OF MINNEAPOLIS, MINNESOTA.

CAR-BRAKE.

SPECIFICATION forming part of Letters Patent No. 667,507, dated February 5, 1901.

Application filed October 15, 1900. Serial No. 33,062. (No model.)

*To all whom it may concern:*

Be it known that I, JOHN H. DIERCKS, a citizen of the United States, and a resident of Minneapolis, in the county of Hennepin and State of Minnesota, have invented a new and Improved Car-Brake, of which the following is a full, clear, and exact description.

This invention relates to improvements in brakes for cars or other vehicles; and the object is to provide a simple brake that may be readily applied to a car, that may be operated by comparatively little manual power, as it is practically self-acting or automatic, and with which the usual shoes bearing upon the wheel peripheries are dispensed with, thus prolonging the life and usefulness of the wheels.

I will describe a car-brake embodying my invention and then point out the novel features in the appended claims.

Reference is to be had to the accompanying drawings, forming a part of this specification, in which similar characters of reference indicate corresponding parts in both the figures.

Figure 1 is a sectional elevation of a car-truck, showing a brake embodying my invention as applied thereto; and Fig. 2 is a plan view.

Referring to the drawings, A and B designate the two trucks of a car to which the brake is applied. It is to be understood, however, that the brake mechanism may be carried out to coact with the wheels of a greater number of trucks. On the wheels 1 2 of the truck A are hubs 3 4, and on the wheels 5 6 of the truck B are hubs 7 8. These hubs are arranged on the inner sides of the wheels and are indicated as integral therewith; but in applying the invention to ordinary wheels the hubs may be made in sections, so as to be placed around the wheel-axles and firmly bolted together and to the wheels.

Engaging with the hub 3 is a brake-strap 9, one end of which has a pivotal connection with a lever 10, and from the upper end of this lever and above its point of connection with the strap 9 a spring 11 extends to a connection with a lever 12, pivoted to the rear cross-rail of the truck A, and connecting with the opposite end of this strap 9 is one end of a link 13, which also at its opposite end engages pivotally with the lever 12. The link 13 is connected to the lever 10 at the lower end, but below its connection with the end of the strap 9, as first described, and from this point of connection at the lower end of the lever 10 a spring 14 extends to a connection with the bolster 15 of the truck. A link 16 connects the upper end of the lever 10 with an arm 17, attached to a rock-shaft 18, having bearings on the truck-frame. A short lever 19 is pivoted to one end of the lever 12—that is, its end opposite that connecting with the link 13—and from one end of the short lever 19 a link 20 extends to a pivotal connection with a lever 21, mounted on the under side of the bolster 15, and from one end of this lever 21 a link 22 extends to a connection with the upper end of a lever 23, pivoted on an arm 24, mounted on the truck-frame. A brake-band 25 surrounds the hub 4 and has one end connected to the lever 23 below its connection with the arm 24 and its other end connected to said lever 23 above its connection with the arm 24. A spring 26 extends between the lever 19 and the bolster 15, and pivoted to this short lever 19 is a draw-rod 27, the other end of said draw-rod being pivoted to an arm 28 on a rock-shaft 29, mounted on the truck B. Mounted on this rock-shaft 29 are oppositely-extended arms 30 and 31, and the downwardly-extended arm 30 has a connection by means of a link 32 with a brake-lever 33, pivoted on an arm 34, attached to the truck B, and connecting with this lever 33 are the ends of a brake-band 35, which engage with the hub 7, the ends of said brake-band being connected, respectively, above and below the pivotal point of said lever 33. From the upper end of the arm 31 a link 36 extends to a connection with a lever 37, pivoted on an arm 38, attached to the truck-frame B, and connecting with said lever 37 are the ends of a brake-strap 39, engaging with the hub 8, the said connections being above and below the pivot-point of said lever. It will be noted that the levers 33 and 37 normally incline in opposite directions, as do also the levers 10 and 23. A draw-rod 40 is connected at one end to an arm 41 on a rock-shaft 18, and from the other end of this draw-rod 40 a chain or cable 42 extends to a connection with a brake-rod 43, arranged on the platform of the car.

In operation when it is desired to set the brakes the brake-rod 43 is to be rotated to draw upon the rod 40. This drawing upon the rod 40 will rock the shaft 18, operating the lever 10 in such direction as to draw the brake-band 9 tightly against the hub 3. As one end of this brake-band 9 is attached to the lever 12, as before described, and as the momentum of the car will have a tendency to increase the frictional pressure of the band 9 upon the hub 3, the said lever 12 will be rocked in such direction as to draw upon the link 20 and the rod 27. The drawing upon the link 20 will set the brake-band 25, and the drawing upon the rod 27 will set the two brake-bands 35 and 39 through the medium of the link connections. Therefore it will be seen that the brake is set upon one wheel only by manual exertion, and this brake thus set operates to set all the other brakes. Upon releasing the brake-rod 43 the several brake-bands will be relieved of pressure and the parts returned to their normal positions by means of the springs, as above described.

Having thus described my invention, I claim as new and desire to secure by Letters Patent—

1. In a car-brake, a hub on one of the wheels, a brake-band for engaging with said hub, a lever with which one end of said band connects, another lever with which the other end of said band connects, a rock-shaft having operative connection with the first-named lever, a brake-rod having connection with said rock-shaft, and band-brakes coacting with other wheels and having operative connection with said other lever and the rock-shaft, substantially as specified.

2. In a car-brake, a hub on one of the wheels, a brake-band for engaging with said hub, a lever with which one end of said band connects, another lever with which the other end of said band connects, a rock-shaft having operative connection with the first-named lever, a brake-rod having connection with said rock-shaft, band-brakes coacting with other wheels and having operative connection with said other lever and the rock-shaft, and springs for moving the brake mechanism to normal position, substantially as specified.

3. In a car-brake, a friction-hub on a wheel-axle, a brake-strap engaging with said hub, a lever to which one end of said strap is secured, a lever pivoted to the car-truck and connecting with the other end of the strap, a spring connection between the two levers, a rock-shaft, a connection between an arm on said rock-shaft and the upper end of the first-named lever, a draw-rod extended from another arm on the rock-shaft, and other brake-straps operated by the braking movement of the first-named strap, substantially as specified.

4. In a car-brake, a friction-hub on a wheel-axle, a brake-strap engaging with said hub, a lever to which one end of said strap is secured, a lever pivoted to the car-truck and connecting with the other end of the strap, a spring connection between the two levers, a rock-shaft, a connection between an arm on said rock-shaft and the upper end of the first-named lever, a draw-rod extended from another arm on the rock-shaft, a short lever mounted on one end of the lever supported on the truck-frame, a connection between said short lever and another brake on the truck, and a connection between said short lever and brakes on another truck, substantially as specified.

In testimony whereof I have signed my name to this specification in the presence of two subscribing witnesses.

JOHN H. DIERCKS.

Witnesses:
OTTO WIRTENSOHN,
ALBERT E. NORTON.